March 15, 1949.　　　　C. M. YOUNG　　　　2,464,629
MANEUVERING AUTOMATIC CONTROL

Filed Jan. 1, 1945　　　　　　　　　　3 Sheets-Sheet 1

Fig. 1a

Inventor:
Charles M. Young,
by Harry E. Dunham
His Attorney.

March 15, 1949.　　　　C. M. YOUNG　　　　2,464,629
MANEUVERING AUTOMATIC CONTROL
Filed Jan. 1, 1945　　　　　　　　　　　3 Sheets-Sheet 2

Inventor:
Charles M. Young,
by Harry E. Dunham
His Attorney.

March 15, 1949.  C. M. YOUNG  2,464,629
MANEUVERING AUTOMATIC CONTROL
Filed Jan. 1, 1945  3 Sheets—Sheet 3

Inventor:
Charles M. Young,
by Harry E. Dunham
His Attorney.

Patented Mar. 15, 1949

2,464,629

UNITED STATES PATENT OFFICE 2,464,629

MANEUVERING AUTOMATIC CONTROL

Charles M. Young, Schenectady, N. Y., assignor to General Electric Company, a corporation of New York Application January 1, 1945, Serial No. 570,992

11 Claims. (Cl. 244—77)

The present invention relates to automatic control equipment for aircraft, and more particularly to equipment for stabilizing an aircraft in flight known in the art as an automatic pilot.

Automatic pilots of the type known as relief pilots have been successfully used for a number of years. These relief pilots, after once having been synchronized and engaged by the human pilot, function to stabilize the aircraft about the three control axes, namely, the vertical or turn axis, the longitudinal or bank axis, and the lateral or pitch axis. By manipulating the rudder, aileron and elevator trim controls of the conventional relief pilot, the human pilot can execute banked turns, climbing and diving spirals, etc. However, to properly coordinate the attitudes of the airplane about the three control axes during a turning maneuver, the human pilot must refer to the natural horizon or instruments and adjust the automatic pilot accordingly. This coordination problem is burdensome for an already overworked human pilot, and it is desirable that it be eliminated. Also, in some cases it is necessary to have the coordination performed automatically when neither the natural nor artificial horizon is visible. This situation arises in the case of night-fighter military aircraft where the instrument panel is blacked out to insure maximum visibility of the surrounding area. Accordingly, the recent trend has been to incorporate in automatic pilots, apparatus for automatically stabilizing the aircraft in the proper attitude for curved or maneuvering flight as well as straight and level flight.

One of the principal problems is designing a maneuvering type of automatic pilot is that of causing the airplane to bank at the proper angle when making a turn, as the proper banking angle depends not only on the rate of turn but also upon the speed of the airplane. As is well known, the proper banking angle in a turn is obtained when the vertical axis of the airplane coincides with the apparent vertical, i. e., the resultant gravitational and centrifugal acceleration forces acting on the airplane. A pendulum mounted for rotation about the longitudinal axis of the airplane provides a simple means for indicating apparent vertical, and due to its simplicity it is desirable to use a pendulum to obtain the proper bank angle. Several attempts have heretofore been made to control the automatic pilot in accordance with the movements of the pendulum, but in general they have not been satisfactory.

Thus, it has been found that if the action of the pendulum in changing the bank angle of the airplane is made rapid, accelerations other than centrifugal accelerations, such as are caused by air bumps, will cause the airplane to oscillate violently in bank. On the other hand, if the action of the pendulum is made slow, an unpleasant skid will be experienced while the pendulum is in the process of correcting the bank angle.

Another difficulty that has been experienced with the pendulums is that they tend to cause instability of the airplane. This instability is caused by the well known fact that an airplane, when banked, tends to turn independently of the rudder. Thus, if the pendulum is momentarily moved in a direction calling for more bank, as might be caused by an air bump, the resulting increased bank will cause the turn rate to increase, thereby holding the pendulum in the bank increase position. As a result of this cumulative action, the airplane tends to go into a progressively tighter turn which is undesirable and dangerous.

Another difficulty with previous pendulum control systems has been that a continuous departure from the correct bank angle has been necessary in order to obtain a correction signal from the pendulum and, therefore, the correct bank angle could not be maintained.

Apart from the difficulties experienced with pendulum bank correctors, there are other difficulties which complicate the designs of the maneuvering pilot arising from the response characteristics of an airplane. Thus, when flying manually, in order to place the airplane quickly into a turn, it is necessary to apply a relatively hard rudder along with the proper aileron or bank control. After the proper bank angle and desired rate of turn are obtained, it is necessary to ease off on the rudder due to the above-mentioned fact that a banked airplane tends to turn itself independently of the rudder. In medium and high speed airplanes, this effect is so pronounced that it is frequently necessary to return the rudder all the way back to the neutral or streamlined position. Therefore, if the final bank angle and final rudder position for a desired rate of turn are initially set in to the automatic pilot by some form of coordinated control, there will be insufficient rudder during the initial stage of the turn so that the tail of the airplane tends to drag or yaw to the low side giving a sluggish and improper maneuver.

An object of the present invention is to provide a new and improved type of maneuvering automatic pilot which is relatively simple in construction and which will automatically and accurately maintain the proper banking angle at various air speeds.

A further object of the invention is to provide a maneuvering automatic pilot utilizing a simple pendulum for adjusting the bank angle, and which is stable in operation.

Another object is to provide a maneuvering automatic pilot which causes the airplane to respond quickly without uncomfortable skid or side slip.

A further object of the invention is to provide a relatively simple maneuvering automatic pilot which can be controlled by a small control stick mounted conveniently to the human pilot.

Another object of the invention is to provide means for automatically returning the airplane to straight and level flight from any maneuvering attitude.

A still further object of the invention is to provide automatic pilot means for maintaining a constant rate of turn of the airplane as well as the proper bank angle during curved flight.

Other objects and advantages of the present invention will become apparent as the following description proceeds.

Briefly, according to the present invention the above-mentioned stability problems arising from the use of a pendulum to indicate a control and proper bank angle are overcome by the use of a vertical position reference, such as the vertical gyro, to stabilize the aircraft in a banked as well as level attitude and by providing a coarse and fine adjusting means for varying the stabilized bank attitude. The coarse bank-adjusting means is actuated by a turn controller, used for making turns, so that the approximate bank angle is introduced as soon as the turn is called for, thereby eliminating any unpleasant side slip or skid. The fine bank-adjusting means is actuated by a reversible motor controlled by a pendulum so that any error in the bank angle set in by the turn controller is gradually corrected by the pendulum to give an accurate or "ball center" turn. Since the range of the bank angle change controlled by the pendulum is relatively small and since the change is slowly made, any oscillation or instability of the pendulum is not appreciably reflected in the response of the aircraft.

In order to obtain the desired hard initial rudder and then gradually return to the rudder to the streamlined position after the desired rate-of-turn is obtained and to maintain the rate of turn constant, a rate-of-turn gyroscope is used to control rudder displacement. The rate-of-turn gyroscope, in holding a constant rate of turn, also prevents the pendulum from tending to cause the aircraft to go into a progressively tighter turn for the reasons pointed out above. In addition to performing the above-mentioned desired control functions, the rate-of-turn gyroscope is connected so that it performs a desired additional function of stabilizing the aircraft in straight and level flight by introducing velocity damping control signals in the rudder control channel.

In order to provide easy maneuvering control of the aircraft by the human pilot through the medium of the automatic pilot control, there is provided a maneuvering control switch by means of which climb, dive, coordinated turns to the right or left, and climbing and diving spirals can be obtained. This is accomplished by using the manuevering switch to control the reversible motors which operate turn and pitch controllers. In order to return the aircraft automatically to straight and level flight from any maneuvering attitude relay means controlled by a reset switch, which may form a part of the maneuvering control switch, are provided which, when actuated by a momentary closure of the reset switch, operate to cause the turn and pitch controllers to return to a neutral position corresponding to straight and level flight.

For a better understanding of the present invention reference should be made to the accompanying drawings in which Figs. 1a and 1b taken together constitute a schematic representation of a maneuvering pilot control system for an aircraft embodying the turn, bank, and other control features forming the subject matter of the present invention.

Figure 1A:
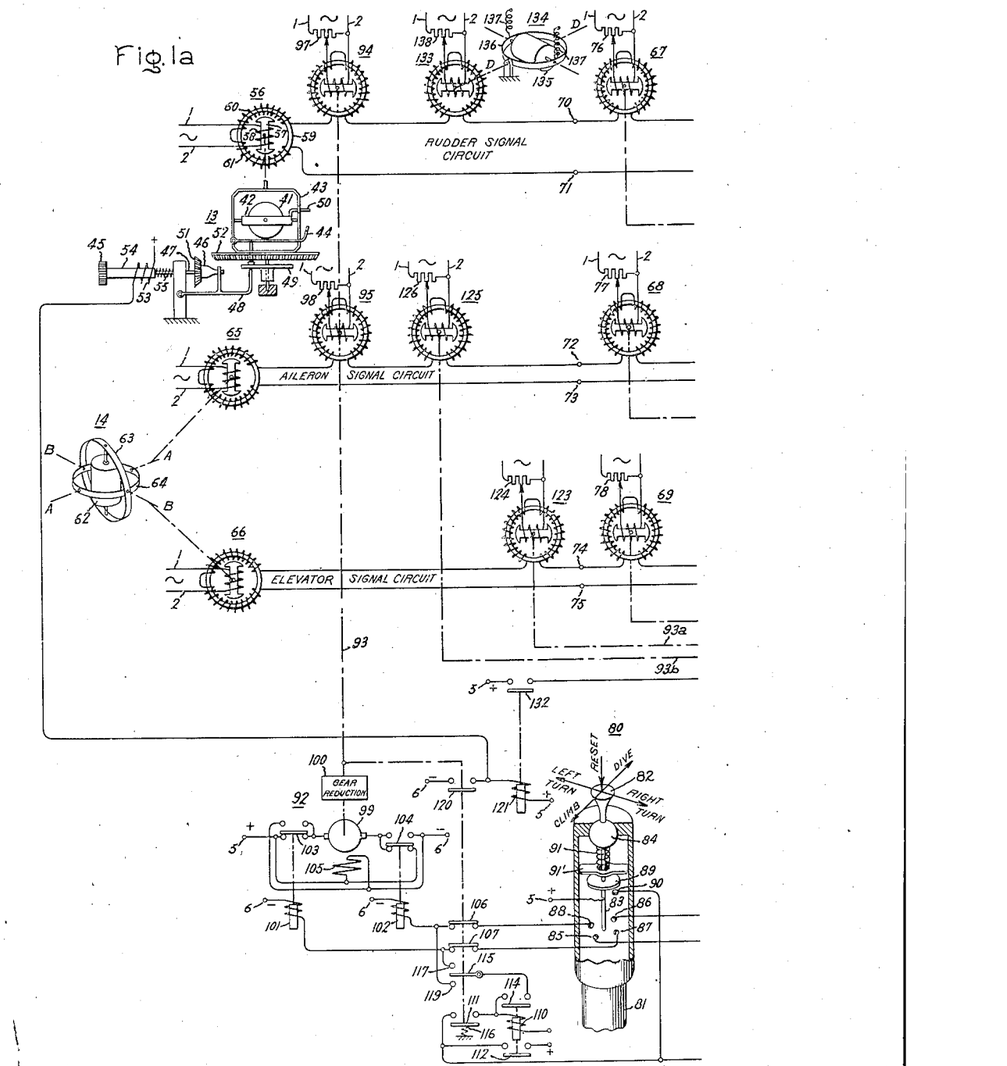
Figure 1B:
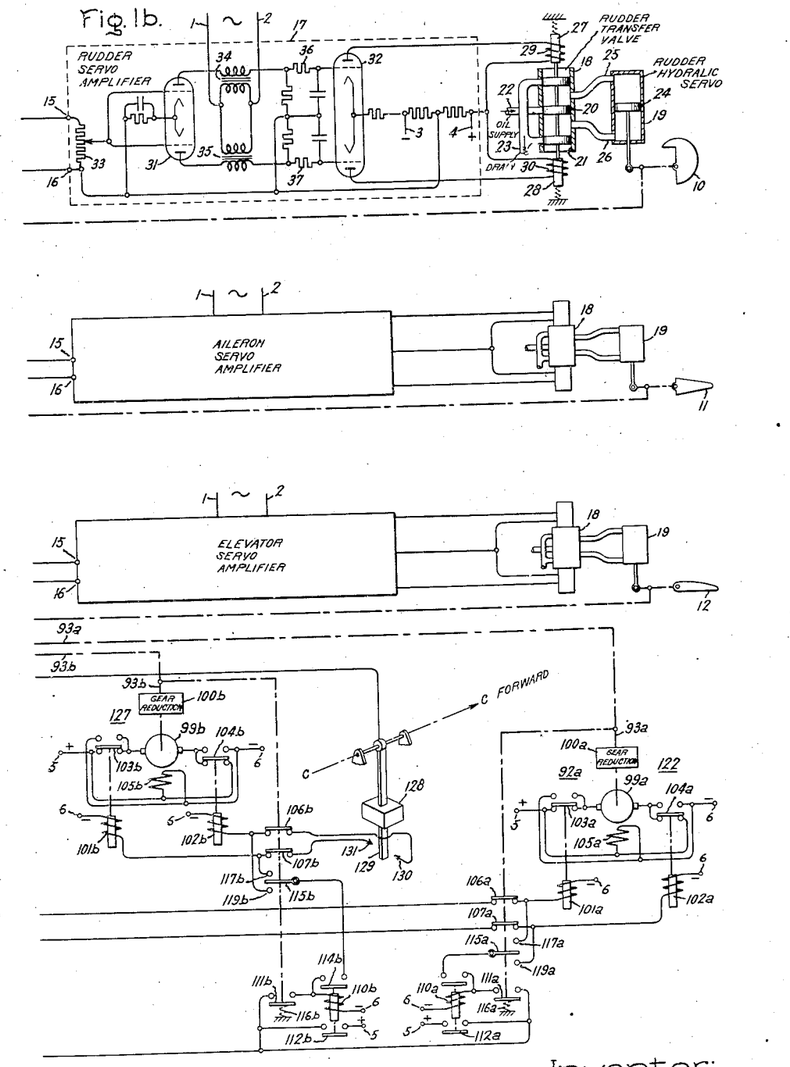

Referring to Fig. 1 of the drawing, the control surfaces 10, 11 and 12 represent the rudder, aileron and elevator controls of an aircraft for controlling movements of the aircraft about the turn, bank and pitch axes respectively. For the purpose of measuring displacement of the aircraft about the turn axis, there is provided a suitable azimuth position-maintaing means such as directional gyro 13, and for measuring the displacement of the aircraft about the bank and pitch axes there is provided a suitable vertical position-maintaining means such as a vertical gyro 14. The basic automatic pilot servo system by means of which the control surfaces 10, 11 and 12 are actuated in accordance with turn, bank and pitch signals received from the directional gyro 13 and the vertical gyro 14 may be, and is here illustrated as being, a polarity sensitive, electric-hydraulic type similar to that disclosed and claimed in a copending application of A. Hansen et al., Serial No. 488,914, filed May 28, 1943, now Patent No. 2,416,097, which is assigned to the same assignee as the present invention.

In the autopilot system disclosed in the above-mentioned Hansen et al. application, control signals are introduced into rudder, elevator and aileron signal circuits which are connected to input terminals of associated servo amplifiers. Considering, for example, the rudder control channel, the servo amplifier 17 has an output which is normally balanced but which becomes unbalanced in either of two opposite senses in response to the polarity and magnitude of alternating current control signals supplied to the input terminals 15 and 16. The normally balanced output of the servo amplifier 17 is connected to energize the solenoids of a solenoid-operated transfer valve 18 which controls the flow of hydraulic oil to a servomotor 19 used to actuate the rudder. Since the polarity sensitive, electric-hydraulic servo systems for the rudder, aileron and elevator control channels are identical, the detailed description will be confined to the rudder channel for the purpose of illustration, similar reference numbers being applied to the corresponding part of the aileron and elevator control channels.

The movements of the hydraulic servomotor 19, which is illustrated as being a push-pull type, are controlled by the solenoid-operated transfer valve 18. The transfer valve comprises a conventional three-land valve element 20 which slides in a suitably ported valve sleeve 21. When the valve element 20 is in the center position shown in the drawing, the ports connected to an oil pressure supply line 22 and an oil drain or return line 23 are closed, and the piston 24 of the hydraulic servomotor 19 is locked. When the valve element is moved downwardly, the pressure and drain ports of the valve are opened in such a manner that the oil flows through pipe 25 to the top side of the servomotor piston 24 forcing it downwardly, the oil on the underside of the piston returning to the drain line 23 through the pipe 26. On the other hand, if the valve is displaced upwardly, oil flows from the pressure line 22 through the pipe 26 to the underside of the piston 24, forcing it upwardly, the oil on the upper side of the piston returning to the drain line 23 through the pipe 25.

Movements of the valve element 20 are controlled by means of two oppositely disposed solenoids 27 and 28 which, when energized, exert opposing forces on the valve element. For the purpose of obtaining proportional control, the solenoids 27 and 28 are preferably of the proportional type, i. e., they position the valve element in accordance with the current flowing in the solenoid energizing windings 29 and 30. Preferably, proportional solenoids, which are responsive to very small changes in energizing current, are used such as are disclosed in a copending application of E. R. Boynton et al., Serial No. 556,535, filed September 30, 1944, now Patent No. 2,435,817, which is assigned to the same assignee as the present invention.

The normally balanced output of the servo amplifier 17 is connected to the windings 29 and 30 of the oppositely disposed solenoids 27 and 28 of the transfer valve 18. Thus, when the amplifer is balanced, the solenoids receive equal energizing currents and the transfer valve remains in the center position in which the servomotor 19 is stationary. However, when an input signal of one polarity is applied to the amplifier input terminals 15 and 16, the current supplied to one solenoid increases while the current supplied to the other decreases, whereby the valve is displaced causing the servomotor 19 to move in one direction. Conversely, if an input signal of the opposite polarity is applied to the amplifier, the unequal current distribution to the solenoid windings is reversed, causing the valve 20 and the servomotor 19 to move in the opposite direction. Due to the proportioning action of the transfer valve, within limits the solenoid current unbalance, the displacement of the valve 20, the oil flow rate, and the resultant speed of the servomotor are proportional to the magnitude of the input signal.

Any one of a number of different types of discriminator-rectifier amplifiers may be used to accomplish the desired function illustrated above. For the purpose of illustration, there is shown a two-stage amplifier comprising a twin triode discriminator electron tube 31 and a twin triode amplifier electron tube 32. An input A.-C. signal voltage supplied to the input terminals 15 and 16, the magnitude of which is adjustable by means of a suitable gain control potentiometer 33 is fed to the grids of the discriminator tube 31. The plates of the tube 31 are supplied with A.-C. from transformers 34 and 35, which are energized from suitable A.-C. supply leads 1 and 2. The transformer secondary windings are connected so that the voltages supplied to the plates of the tube 31 are 180 electrical degrees out of phase. In this manner, the rectified output of the two sections of the tube 31 are made to vary oppositely in accordance with the polarity of the input signal, the input signal being in phase or 180 degrees out of phase with the A.-C. supply voltage. The rectified outputs of the two sections of the discriminator tube 31 are fed to the tube grids of an amplifier tube 32 after passing through suitable filter networks which may comprise resistors 36 and capacitors 37. The positive terminal 4 of a suitable D.-C. "B" power supply is connected to the two opposite plates of the amplifier tube 32 through the two solenoid windings 29 and 30 of the solenoids 27 and 28, the common cathode return circuit being connected to the negative terminal 3 of the D.-C. "B" power supply. In view of the foregoing, it will now be apparent to those skilled in the art that the output of the two sections of the amplifier tube 32, and consequently the relative energization of the two solenoids 27 and 28 of the transfer valve 18 will vary in accordance with the polarity and magnitude of the A.-C. input signal voltage supplied to the input terminals 15 and 16 within saturation limits of the amplifier.

Summarizing, it may be said that the servo amplifier, transfer valve, and hydraulic servo of each of the three control channels constitute a polarity sensitive, electro-responsive means for actuating the associated control surface in a direction determined by the polarity of the input signal voltage and at a speed which is proportional, within limits, to the magnitude of the input voltage. Obviously, other combinations of amplifiers and electric hydraulic, or other types of servomotors, may be used to accomplish the same results.

The manner in which the control signals are introduced into the rudder, aileron and elevator signal circuits to cause actuation of the rudder, aileron and elevators of the aircraft so as to stabilize the aircraft in curved as well as straight and level flight, and to permit maneuvering of the aircraft in accordance with the present invention now will be described.

As mentioned above, a conventional directional gyro 13 may be used as a reference to measure displacement of the aircraft about the vertical or turn axis. The directional gyro is shown as comprising a gyro rotor 41 which is rotated by any suitable motor means, not shown. The gyro is mounted for three degress of freedom in a conventional gimbal system comprising an inner or horizontal gimbal ring 42 and an outer or vertical gimbal ring 43. The gyro spin axis lies in a horizontal plane, and due to the characteristic gyroscopic property of rigidity, the vertical gimbal ring 43, which is mounted in a case (not shown) for rotation about a vertical axis, tends to maintain its azimuth orientation in space.

For the purpose of setting the desired azimuth course heading and during certain maneuvering operations which will be described in greater detail below, it is necessary to cage the directional gyro. To accomplish the caging and coursesetting function, there is shown in schematic form a conventional arrangement comprising a caging arm 44, one end of which is pivotally mounted on the vertical gimbal ring 43. When a knob 45 is pushed inwardly, a cam 46 mounted on a shaft 47 causes a link 48, a disc 49, and engaging arm 44 to move upwardly whereupon a forked end of the caging arm 44 engages a pin 50 connected to the inner gimbal 42 so as to lock the gyro in a well known manner. Inward movement of the knob 45 and the shaft 47 also cause a pinion 51 to engage a ring gear 52 coupled to the outer gimbal 43 so that by rotation of the knob 45 the gyro assembly can be rotated about the vertical axis of the gimbal ring 43 to set a desired course.

In order to provide means for automatically caging the directional gyro in response to an electric signal, I have shown schematically a solenoid having a winding 53 arranged to actuate a plunger 54 which may be connected to, or form a part of, the caging mechanism as shown. Thus, when the winding 53 is energized, the solenoid moves the plunger 54 inwardly to effect a caging of the gyro, and when the solenoid is deenergized a spring 55 moves the caging mechanism in the opposite direction to uncage the directional gyro.

Figure 3:
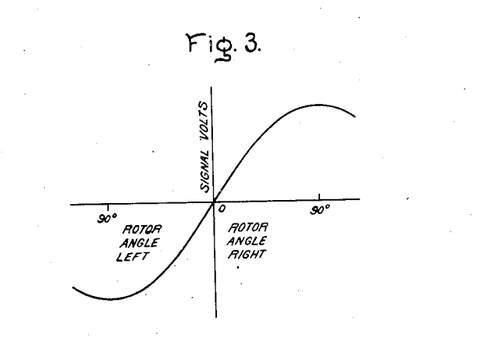
Fig. 3 is a curve showing the relationship between the voltage output and the rotor position of the signal generators forming a part of the control system, the curve being useful in explaining the operation of the invention.

In order to obtain a suitable control signal responsive to displacement of the aircraft about its turn axis for controlling the rudder so as to maintain constant heading or course, there is provided a turn-responsive signal generator 56. This signal generator is an inductive type comprising a rotor 57 having a primary or exciting winding 58 and a stator 59 having two differentially connected windings 60 and 61. The rotor winding is connected to the A.-C. supply lines 1, 2 as are all of the signal generators and servo amplifiers of the automatic pilot system so as to maintain proper phase relationship of the control signals. When the rotor of the signal generator is in the null position shown, the voltages induced in the stator windings cancel out, giving a zero output signal. If the rotor is displaced in one direction from the null position, a net voltage is induced in the stator windings which is in phase with the primary voltage. On the other hand, if the rotor is displaced in the opposite direction, a net stator voltage is induced which is 180 degrees out of phase with the primary voltage. For rotor displacement in either direction from the null position, the voltage output of the stator windings varies approximately sinusoidally, as indicated by the curves shown in Fig. 3 of the drawing, which shows the relationship between the stator voltage and the rotor angle.

The rotor of the signal generator 56 is coupled directly to the vertical gimbal ring 43 of the directional gyro 13, while the stator 59 is mounted on the case of the gyro (not shown) so that it rotates with the airplane. Due to the fact that the directional gyro holds the rotor of the turn-responsive signal generator fixed in space while the stator rotates with the aircraft, it will be evident that the stator output voltage will vary in phase and magnitude in accordance with the direction of displacement of the aircraft from a predetermined fixed azimuth heading; and the magnitude of the voltage will vary with the amount of displacement.

The vertical or horizon gyro 14 which is used as a reference for measuring displacement of the aircraft about the pitch and bank axes comprises a rotating gyro element 62 having a vertical spin axis, the gyro being rotated by any suitable motor means, not shown. The gyro is mounted for three degrees of freedom in a conventional gimbal system comprising a vertical gimbal ring 63 and a horizontal gimbal ring 64. The vertical gyro is oriented so that when the aircraft is level, the axis of rotation AA of the gimbal 64 lies in the direction of the longitudinal axis, while the axis of rotation BB of the gimbal 63 lies in the direction of the transverse axis of the aircraft. Due to the characteristic gyroscopic property of rigidity, the vertical gyro tends to maintain the orientation of its spin axis in space so that displacement of the aircraft about the axes AA and BB can be measured by movement of the gyro case relative to the gimbals 63 and 64 in a well known manner. Conventional erecting means (not shown) may be provided to keep the gyro spin axis vertical.

To obtain control voltages variable in polarity and magnitude in accordance with the displacement of the aircraft about the pitch and bank axes, bank and pitch-responsive signal generators 65 and 66 are provided, these generators being identical in construction to the turn-responsive signal generator 56 described above. The rotor of the bank-responsive signal generator 65 is coupled directly to the gimbal 64 of the vertical gyro so as to be responsive to banking movements of the aircraft about the axis AA, while the rotor of the pitch-responsive signal generator 66 is directly coupled to the gimbal 64 of the vertical gyro so as to be responsive to displacement of the aircraft about the pitch axis BB.

In order to achieve stability in an automatic pilot, it is desirable to provide some means for limiting the displacement of the rudder, aileron and elevator control surfaces to an amount which is some function of an input displacement signal. This limitation in the amount of control surface movement may be accomplished in a number of ways, such as by feeding back a signal proportional to the displacement of the control surface, or proportional to the reactive force on the control surface resulting from its movement into the air stream from its streamlined or flight neutral position. The automatic pilot illustrated is of the so-called displacement type in which the feedback signal is proportional to the displacement of the control surface. This is accomplished by the provision of follow-up signal generators 67, 68 and 69, the outputs of which are connected in the rudder, aileron and elevator signal circuits, respectively. The follow-up signal generators are shown as being identical in construction to the turn, bank and pitch-responsive signal generators described above. The rotors of the follow-up signal generators are mechanically coupled to the hydraulic servomotors 19, as indicated by the dotted lines, so that they are rotated in either direction from the null or zero voltage position in accordance with the direction of movement of the servomotor from the position of the associated control surface. As indicated, the primary windings of the follow-up signal generators are connected to the common A.-C. supply lines 1, 2.

The operation of the follow-up signal generator may best be understood by considering the effect of applying an A.-C. signal voltage to the terminals 70 and 71 of the rudder signal circuit. If the applied A.-C. signal voltage is in phase with the A.-C. source 1,2, the servo amplifier 17 will be unbalanced in one sense, causing a displacement of the transfer valve and a movement of the servomotor 19 in one direction. Movement of the servomotor causes a rotation of the rotor of the signal generator 67 until the ouput voltage of the stator is equal and opposite to that applied to the terminals 70 and 71, at which point the servo amplifier rebalances and the servomotor stops. Similarly, if a signal voltage of the opposite polarity is applied to the terminals 70 and 71, the servo amplifier output is unbalanced in the opposite sense, causing movement of the control surface in the opposite direction until the follow-up signal generator voltage balances out the applied signal.

Similarly, application of signal voltages to the terminals 72 and 73 of the aileron signal circuit and the terminals 74 and 75 of the elevator signal circuit, will cause a displacement of the ailerons 11 and the elevators 12, in proportion to the magnitude of the applied signal voltage and in a direction dependent upon the polarity of the signal voltage. By means of suitable potentiometers 76, 77 and 78, the rotor or primary excitation of the follow-up signal generators 67, 68 and 69 may be changed to vary the follow-up ratio of the control surface, i. e., the ratio of the control surface movement to the applied displacement signal. By varying the follow-up ratio the stiffness of the control may be varied as desired.

The turn-responsive signal generator 56, the bank-responsive signal generator 65, and the pitch-responsive signal generator 66 are connected in the rudder, aileron and elevator signal circuits so as to provide displacement signal voltages in response to displacement of the aircraft about the turn, bank and pitch axes respectively. The polarities of the displacement signals are such that they cause a displacement of the associated control surface in a direction to bring the airplane back to a predetermined heading or attitude at which the output of the turn, bank and pitch-responsive signal generators is such as to reduce to zero the voltages applied to the terminals 70, 71 of the rudder signal circuit, the terminals 72, 73 of the aileron signal circuit and the terminals 73, 74 of the elevator circuit. In other words, there is provided a null-seeking servo system in which the aircraft itself is the responsive element.

From the foregoing it will be apparent that the apparatus thus far described will function to stabilize the aircraft about the three control axes.

According to the present invention, additional signal generators are provided for introducing control signals into the rudder, aileron and elevator signal circuits for the purpose of making maneuvering stabilized turns as will now be described.

For the purpose of making stabilized maneuvering turns, climbs and dives, and climbing and diving spirals by the introduction of turn, bank and pitch signals in the control channels of the automatic pilot, there is provided a maneuvering control switch 80 which may be placed at some location convenient to the human pilot. In the illustrated arrangement, the maneuvering switch 80 is shown as being mounted on the top of the conventional joystick 181 but obviously it could be located in any other convenient place. The maneuvering switch is shown as comprising a handle portion 82 which is adapted to be pushed forward or backward to effect a dive or climb, and to be pushed to the left or to the right to effect a banked turn to the left or to the right depending upon the direction of actuation of the handle. The handle 82 is also adapted to be pushed vertically downward to close a reset switch which causes the aircraft to return to straight and level flight automatically from any maneuvering attitude.

While the maneuvering switch and the reset switch may have any one of a number of equivalent forms, I have shown a simplified arrangement in which the handle 82 is coupled to a vertically depending switching member 83 which is mounted for universal movement by means of a ball member 84 which is received in a hemispherical socket open at the bottom. When the handle 82 is pushed forward to effect a dive, the switching member 83 moves backward until it engages a contact 85. If the handle 82 is moved backward to effect a climb, the switching member 83 moves forward until it engages a contact 86. On the other hand, if the handle 82 is moved to the left to effect a left turn, the switching member 83 moves to the right until it engages a contact 87. Similarly, if the handle 82 is moved to the right to effect a right turn, the switching member 83 moves to the left until it engages a contact 88.

In order to provide means for closing the reset switch when the handle 82 is depressed, there is provided a circular contact or switching member 89 which is formed of electrically conducting material and which is mounted on and electrically connected to the switching member 83. When the handle 82 is depressed, the contact 89 engages a stationary contact 90, the contacts 89, 90 constituting the reset switch. The movable contact 89 of the reset switch and switching member 83 are normally biased to the upward position by means of a suitable biasing spring 91, which in the illustrated arrangement is a compression spring, the top of which bears against the bottom of the ball member 84, the bottom portion resting on a suitable apertured cross support 91'.

The maneuvering and control equipment which is controlled by the maneuvering and reset switches may be energized from any suitable source of D.-C. supply, such for example as the 24 volt supply system which is usually available on aircraft. The positive terminal of the D.-C. supply is indicated by the numeral 5, and the negative terminal is indicated by the numeral 6. In order to avoid unnecessary complication of the drawing, the low voltage D.-C. power supply wires are not shown running between the various units about to be described, but instead are simply indicated by the numerals 5 and 6. Similarly, the alternating voltage signal supply has been indicated by the numbers 1 and 2.

Figure 2:
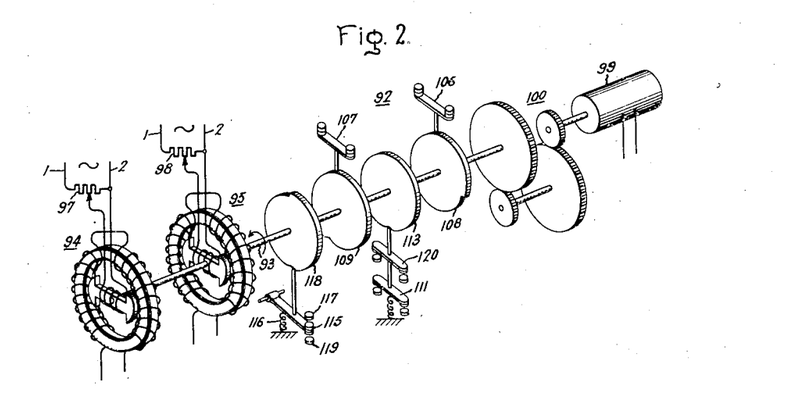
Fig. 2 is a more detailed view showing the constructional features of the turn controller.

For the purpose of introducing turn and bank control signals in the rudder and aileron signal circuits to make maneuvering coordinated turns to the left or right in response to a left or right movement of the handle 82 of the maneuvering switch 80, there is provided a turn controller indicated generally at 92, the details of which are shown in Fig. 2 of the drawing. The turn controller 92 comprises a rotatable shaft 93 which is connected to drive the rotors of a turn control signal generator 94 and a bank control signal generator 95. The signal generators 94 and 95 may be, and are illustrated as being, identical in construction to the other signal generators previously described. The rotors of the signal generators are shown as being connected to the A.-C. supply 1, 2 through suitable voltage-adjusting potentiometers 97 and 98 by means of which the voltage gradient of the stator output signals may be adjusted as desired. The rotors of the signal generators 95 and 94 are shown in the neutral or straight flight position in which the stator or output voltages are zero. By reference to Fig. 1 of the drawing, it will be noted that the turn control signal generator 94 is connected in series circuit relation in the rudder signal circuit while the bank control signal generator 95 is connected in series circuit relation in the aileron signal circuit. Thus when the shaft 93 is displaced in a counterclockwise direction from the neutral position as indicated by the arrow, turn and bank signals are introduced into the rudder and aileron control circuits having polarities which may be selected to cause a right turn and a right bank. On the other hand, if the shaft 93 is rotated in a clockwise direction, the polarities of the output signals of the turn and bank signal generators 94 and 95 will be reversed so as to cause a left turn and a left bank.

In order to rotate the shaft 93 in either direction from the neutral position to effect right and left banked turns, there is provided a reversible motor 99 which drives the shaft 93 through a suitable gear reduction 100. The reversible motor 99, which may be a D.-C. shunt motor, is controlled by forward and reverse contactors 101 and 102. Conventional control switches 103 and 104 controlled by the forward and reverse contactors 101 and 102 apply direct current power from the supply leads 5, 6 to the armature of motor 99, the polarity of which and the resultant direction of rotation of the motor depending upon which contactor is energized. Thus when contactor 101 is energized, the motor 99 rotates in a direction which will be assumed to be such that the shaft 93 of the turn controller rotates in a clockwise direction, causing a left turn and bank. Similarly, when the contactor 102 is energized, the motor 99 rotates in the reverse direction causing a right turn and bank. It will be noted that when contactors 101 and 102 are both deenergized, the armature of the motor 99 is shorted, thus giving a desired dynamic braking action to prevent overtravel due to the fact that the field 105 of the motor is continuously energized. The power circuits of the energizing coils of the contactors 101 and 102 are completed through the contacts 88 and 87 of the maneuvering switch 80. Thus when the handle 82 of the maneuvering switch 80 is displaced to the left, the switching member 83, which is connected to the line 5 of the D.-C. power supply, engages contact 87 energizing contactor 101 causing the motor 99 to rotate in a direction to give a left turn. Similarly, if the handle 82 is displaced to the right, switching member 83 engages contact 88 energizing contactor 102 which causes motor 99 to rotate in the opposite direction to give a right turn.

In order to prevent travel of the turn controller beyond its operating limits, suitable limit switches 106 and 107 are placed in the energizing circuits of the contactors 101, 102. The limit switches 106, 107 may be actuated by suitable cams 108 and 109 mounted on the rotatable shaft 93.

In order to cause the turn controller to return to the neutral or straight flight position in response to a momentary closure of the reset switch contacts 89 and 90, a relay system is provided which will now be described. Whenever the reset switch contacts 89 and 90 are closed, a circuit is completed to the energizing coil of a reset relay 110 through a switch 111, causing the relay 110 to pick up. The energizing circuit of the relay 110 is then maintained independently of the reset switch by the closure of a sealing switch 112 actuated by the reset relay. The switch 111 is actuated by means of a cam 113 on the shaft 93 of the turn controller which is so shaped the switch 111 is closed when the turn controller is displaced in either direction from the neutral position, but is open when the turn controller is in neutral position. Thus, if the turn controller is off-center when the reset switch is closed, the reset relay 110 picks up and remains in the energized condition until the turn controller returns to the center position in which the switch 111 opens, deenergizing the reset relay. When the reset relay 110 is energized, it closes switch 114 completing a power circuit to the energizing winding of either contactor 101 or 102, depending upon the position of a switching member 115. When the turn controller is in a position rotated counterclockwise from center, a spring 116 moves the switching member 115 upwards until it engages a contact 117, energizing contactor 101. This causes the motor 99 to run the turn controller in a clockwise direction until the center position is reached where switch 111 opens deenergizing the reset relay 110 and opening the circuit to the contactor 101. If the turn controller is in a clockwise rotated position from center at the time the reset switch is actuated, a cam 118 on the shaft 93 operates through a follower to push the switching member 115 downwardly until it engages a contact 119 so that a circuit for the energizing winding of contactor 102 is completed. This causes the motor 99 to rotate the turn controller in a counterclockwise direction until the center position is reached where switch 111 opens and deenergizes the reset relay 110 and the contactor 102.

The cam 113 on the turn controller shaft 93 also operates a switch 120 which, like the switch 111, is closed when the turn controller is rotated in either direction from center, but is opened when the turn controller is on center. Circuit connections are provided so that when the switch 120 closes, an energizing circuit is completed to the caging solenoid 53 to cause the caging of the directional gyro 13. Closure of the switch 120 also completes the energizing circuit of a pendulum relay 121. The purpose of the switching operations performed by the switch 120 will become apparent as the description proceeds.

In order to provide means for changing the pitch angle of the aircraft in accordance with forward and backward movements of the handle 82 of the maneuvering switch 80, there is provided a pitch controller indicated generally at 122. The construction of the pitch controller is substantially the same as the turn controller, and therefore corresponding parts have been given the same identifying numerals except that they are distinguished by the subscript "a." Mechanically coupled to the shaft 93a of the pitch controller is a pitch control signal generator 123, the stator windings of which are connected in series circuit relation in the elevator signal circuit. As in the case of the other signal generators, the rotor winding of the pitch control signal generator is connected to the A.-C. supply 1, 2 through a suitable voltage gradient adjusting potentiometer 124. The pitch control signal generator 123 introduces a voltage in the elevator signal circuit causing the pitch attitude of the aircraft to change to a climbing attitude or a diving attitude, depending upon the direction and amount of rotation of the pitch controller shaft 93a from the center, level flight position. The direction of rotation of the reversible motor driving the pitch controller is controlled in accordance with forward and backward movement of the handle 82 of the maneuvering switch 80 by completing the energizing circuits of the forward and reverse contactors 101a and 102a through the contacts 85 and 86. Thus, by pushing handle 82 forward, switching member 83 engages contact 85, picking up contactor 102a and causing the motor 99a to rotate the rotor of the pitch control signal generator 123 in a direction to cause a dive. Similarly, if the handle 82 is pushed backwards, the switching member 83 engages contact 86, picking up contactor 101a causing motor 99a to rotate in the opposite direction to cause a climb.

Momentary closure of the reset switch contacts 89 and 90 also causes the pitch controller reset relay 110a to pick up and operate the reversible motor 99a in a direction to restore the pitch controller to the center, level flight position as will be clear by comparison with the above-described turn controller.

The voltage introduced to the aileron signal circuit by means of the bank control signal generator 95 may be adjusted by means of the potentiometer 98 so that the bank angle of the aircraft will be correct for some average flying speed. If, however, the flying speed is greater than the average value a steeper bank angle will be required because, as is well known, the correct bank angle increases with an increase of speed of the aircraft, the relationship being shown by the equation:

$$\tan \phi = \frac{\omega v}{g}$$

where $\phi$ is the bank angle, $\omega$ is the angular velocity of the aircraft, $v$ is the velocity of the aircraft, and $g$ is the acceleration of gravity.

On the other hand, if the speed of the aircraft is below the average speed, a smaller bank angle than the bank angle called for by the bank control signal generator 95 will be required as will be apparent from a consideration of the above equation.

For the purpose of further adjusting the bank angle so that it will be correct for all values of air speed, there is provided a bank trim signal generator 125, the output of which is also connected in series circuit relation in the aileron signal circuit. The rotor or primary winding of the bank trim signal generator 125 is connected to the A.-C. supply 1, 2 through a suitable adjusting potentiometer 126 by means of which the voltage output of the signal generator may be varied as desired. The bank trim signal generator 125 is actuated by means of a bank trim controller indicated generally at 127. The bank trim control 127 is essentially the same as the turn controller 92 and the pitch controller 122, and corresponding parts have been given the same identifying numerals except that they are distinguished by the addition of a subscript b. The reset relay 110b returns the bank trim controller to the center position upon closure of the reset switch in the same manner as the turn controller.

For the purpose of controlling the direction of rotation of the reversible motor 99b of the bank trim controller so as to actuate the bank trim signal generator 125 in a proper direction to correct the angle of bank, there is provided a pendulum 128. The pendulum 128 is mounted in the aircraft for pivotal movement about an axis CC which is parallel to or coincident with the longitudinal axis of the aircraft. The pendulum 128 carries on its lower portion a switching member 129 which is adapted to engage a stationary contact 130 when the pendulum deflects to the right, and to engage a stationary contact 131 when the pendulum deflects to the left. The switching member 129 of the pendulum is connected to the line 5 of the D.-C. power supply through a switch 132 controlled by the pendulum relay 121. Also, the energizing winding of the contactor 101b of the bank trim controller is connected to the pendulum contact 131 while the energizing winding of the other contactor 102b of the bank trim controller is connected to the other pendulum contact 130. Thus, when switch 132 is closed and the switching member 129 swings to the right, engaging contact 130, the contactor 102 is energized causing the motor 99b to rotate in one direction; and when the switching member 129 swings to the left, engaging contact 131, the contactor 101b is energized causing the motor 99b to rotate in the opposite direction. The direction of rotation of the motor 99b and the polarity of the voltage output of the bank trim signal generator 125 are selected so that when the pendulum 128 swings to the right, causing engagement of the contacts 129 and 130, the voltage output of the bank trim signal generator 125 is changed in a direction to increase a left bank or decrease a right bank. On the other hand, when the pendulum 128 swings to the left, causing engagement of contacts 129 and 131, the motor 99b and the rotor of the bank trim signal generator 125 rotates in the opposite direction to change the voltage output of the bank trim signal generator in a direction to increase a right bank or decrease a left bank. Since the bank adjustment signal generator 95 and the bank trim signal generator 125 are connected in series circuit relation, the voltage outputs will be algebraically added. Thus if the voltage output of the signal generator 95 is in phase with the source voltage 1, 2, and this causes a left bank, and the signal generator 125 is actuated to produce a voltage which is also in phase with the voltage 1, 2, then the amount of left bank will be increased. On the other hand, if the voltage output of the signal generator 125 is out of phase by 180 degrees, with the reference voltage 1, 2, then the signal generator 125 will act to decrease the left bank. Similarly, if the voltage output of the signal generator 95 is 180 degrees out of phase with the source voltage 1, 2, and this causes a right bank, a voltage output of the signal generator 125, which is also 180 degrees out of phase with the source voltage 1, 2, will act to increase the right bank. On the other hand, if the voltage output of the signal generator 125 is in phase with the reference voltage it will subtract from the voltage output of the signal generator 95 and act to decrease the amount of right bank.

If, during a turn the angle of bank introduced by the operation of the bank adjustment signal generator is correct so that the vertical axis of the aircraft coincides with the apparent vertical, i. e., the resultant of the gravitational and centrifugal acceleration forces, the pendulum 128 and the switching member 129 will occupy the center position in which the reversible motor 99b is stationary.

If it is assumed that a left turn and bank are being made and the angle of bank called for by the signal generator 95 is too shallow, so that the aircraft tends to skid, the pendulum 128 will move to the right, causing engagements of contacts 129 and 130, and rotation of the motor 99b and rotor of the signal generator 125 in a direction to increase the left bank. When the correct bank angle is reached, the pendulum 128 will return to the center position and the motor 99b will stop.

If, during the left turn and bank the angle of bank is too steep for the air speed so that the aircraft tends to sideslip, pendulum 128 will swing to the left, causing engagements of contacts 129 and 131 and rotation of the motor 99b and the rotor of the signal generator 125 in a direction to decrease the left bank.

If, on the other hand, a right bank is being made and the angle of bank called for by the signal generator 95 is too shallow, causing a skid, the pendulum 128 swings to the left causing engagement of contacts 129 and 131 and rotation of the motor 99b and the rotor of the signal generator 125 in a direction to increase the right bank. This action will continue until a correct bank angle is reached, at which point the pendulum 128 will return to the center position, deenergizing motor 99b. If during the right bank the angle of bank called for by the signal generator 95 is too steep, tending to cause a sideslip, the pendulum 128 will move to the right causing engagement of contacts 129 and 130 and rotation of the motor 99b and the rotor of the signal generator 125 in a direction to decrease the right bank. Thus, it will be seen that the pendulum control bank trim signal generator 125 operates to maintain the proper banking angle for air speeds other than the average speed for which the bank adjustment signal generator 95 is set. The range of bank angle adjustment necessitated by air speed changes within the normal operating range is relatively small compared to the range of bank angle adjustment required of the signal generator 95. Thus the bank trim signal generator 125 may be considered a vernier or fine adjustment while the bank adjustment signal generator 95 may be considered a coarse bank adjustment. By adjusting the potentiometer 126, the range of bank trim adjustment can be varied as desired.

When the aircraft is in straight flight and the turn controller is in the center position, switch 120 is opened so that pendulum relay 121 is deenergized, opening switch 132. This disconnects the pendulum switch from the power supply so that the motor 99b is no longer responsive to movements of the pendulum. This is done to prevent oscillation of the pendulum such as might be caused by air bumps from causing changes in bank trim which might result in an undesirable yawing of the aircraft from the desired course. When the turn controller is operated in either direction from center by actuation of maneuvering switch 90, switch 120 closes, picking up pendulum relay 121 which closes switch 132, rendering the pendulum operative to adjust bank angle.

When the turn controller 92 is actuated in either direction from the center position to cause a right or left turn, the closing of switch 120 also energizes the caging solenoid 53 to cage the directional gyro 13. As a result of the caging of the directional gyro, the turn-responsive signal generator is rendered ineffective so that it no longer produces a signal voltage representing displacement of the aircraft about the turn axis. If this were not done, the turn-responsive signal generator 56 would generate a voltage in response to a turning of the aircraft which would cancel out the voltage output of the turn control signal generator 94, thus stopping the turn. When the aircraft is returned to straight flight by return of the turn controller to the center position, the opening of switch 120 deenergizes the caging solenoid 53 so that the spring 55 moves the caging mechanism to uncage the directional gyro, whereupon the turn-responsive signal generator 56 again becomes operative to stabilize the aircraft about the turn axis and maintain it on a predetermined heading.

For the purpose of providing additional azimuth stabilization during straight flight, and for maintaining a constant rate of turn during curved flight, there is provided a rate of turn-responsive signal generator 133 which is connected in series circuit relation in the rudder signal circuit. In order to actuate the rotor of the signal generator 133 to produce a voltage variable in accordance with the rate of turn of the aircraft about the turn axis, there is provided a conventional rate-of-turn gyroscope indicated generally as 134. The rate-of-turn gyroscope 134 may be of conventional construction comprising a gyro rotor 135 which is mounted for two degrees of freedom in a horizontal gimbal ring 136. The gimbal ring 136 is mounted in the aircraft for rotation about an axis DD, which extends in a plane parallel to the floor of the aircraft so that turning of the aircraft in azimuth results in a precession of the gyro spin axis. As a result of precision of the gyro spin axis caused by a turning of the aircraft in azimuth, the gimbal 136 tends to rotate about the axis DD in a direction dependent upon a direction of turn of the aircraft. Rotational movement of the gimbal 136 is restrained by means of restraining spring 137 so that rotation of the gimbal is a measure of a rate of turn of the aircraft in a well known manner. The rotor of the signal generator 133 is directly coupled to the gimbal 136 of the rate-of-turn gyroscope so that the voltage output of the signal generator varies in polarity and magnitude in accordance with the direction of turn and rate of turn of the aircraft about the turn axis. The rotor of the signal generator 133 is energized from the A.-C. supply 1, 2 and the voltage gradient of the signal generator is adjustable as desired by means of a potentiometer 138.

In operation, let it be assumed the maneuvering switch 90, the turn controller 92, the pitch controller 122 and the bank trim controller 127 are all in a center or neutral position. For this condition, the voltage outputs of the turn control signal generator 94, the bank control signal generator 95, the bank trim signal generator 125 and the pitch control signal generator 123 are all zero. Also, the turn controller being in the central position, switch 120 is opened so that the directional gyro 13 is uncaged and the pendulum-operated bank trim controller is inactive. Displacements of the aircraft about the turn, bank and pitch axes result in voltages being produced by the turn-responsive signal generator 56, the bank-responsive signal generator 85, and the pitch-responsive signal generator 86, which are introduced into the rudder, aileron and elevator control circuits to cause actuation of the rudder 10, the aileron 11 and the elevators 12 in the proper direction to correct for the displacement. Therefore, the aircraft is stabilized about the three control axes so that straight and level flight is maintained.

In straight flight the azimuth stabilization resulting from the operation of a turn-responsive signal generator 56 is supplemented by the action of the rate-of-turn-responsive signal generator 133. Thus let it be assumed that the aircraft starts to deviate to the left. The turn-responsive signal generator 56 produces a signal voltage, causing a certain amount of right rudder to be applied. The left turning movement of the aircraft also causes a displacement of the rate-of-turn gyroscope and rate-of-turn signal generator 133 in a direction producing a voltage adding to the voltage of the signal generator 56 so that the rudder is further displaced to the right to counteract the turn. However, as soon as the airplane responds it begins to turn to the right to return to course, the rate-of-turn-responsive signal generator 133 is actuated in the opposite direction producing a voltage subtracting from the voltage of the signal generator 56. The rudder is therefore returned to neutral more quickly than would otherwise be the case, and may even move to the opposite direction so that any tendency to overshoot or hunt is substantially precluded. In other words, the rate-of-turn-responsive signal generator 133 introduces a velocity-damping signal in the rudder signal circuit which causes operation of the rudder in a direction to damp angular movements of the aircraft about the turn axis. This additional stabilization is particularly desirable in the rudder channel because the moment of inertia of the aircraft about the turn axis is generally considerably greater than about the other control axes, rendering stabilization about the turn axis more difficult.

If now the pilot desires to make a coordinated turn, say to the left, the handle 82 of the maneuvering switch 80 is displaced to the left, and maintained in that position until the desired rate of turn is obtained. It is then returned to the center or neutral position. The displacement of the maneuvering switch to the left causes the shaft 93 of the turn controller 92 to rotate in a clockwise direction. This movement closes switch 120, causing the directional gyro 13 to become caged and the pendulum relay 121 to become energized to render the pendulum-operated bank trim controller operative.

Movement of the turn controller shaft also actuates turn control signal generator 94, introducing a voltage in the rudder signal circuit to give a hard, left rudder. As the aircraft turns to the left in response to the movement of the rudder, the rate-of-turn gyroscope 134 actuates the signal generator 133 so that a voltage is produced opposing the voltage produced by the turn control signal generator 94 whereupon the rudder is returned towards the streamlined position, and will subsequently occupy whatever position is necessary to maintain a constant rate of turn which is proportional to the voltage output of the turn control signal generator 94. It will be apparent that the longer the maneuvering switch is displaced to the left, the greater will be the voltage output of the turn control signal generator 94, and consequently the rate of turn which is maintained by the rate-of-turn gyroscope 134.

The bank control signal generator 95 is also actuated simultaneously with the turn control signal generator 94 and introduces a voltage into the aileron signal circuit causing a deflection of the ailerons 11 in a direction to bank the aircraft to the left. As the aircraft banks to the left, the voltage produced by the bank-responsive signal generator 65 opposes the voltage produced by the bank control signal generator 95 and equilibrium is reached when the bank angle is such that the voltage outputs of the signal generators 65 and 95 cancel each other. It will be apparent that this bank angle is a function of the output voltage of the bank control signal generator 95, and therefore the angle of bank introduced will be proportional to the rotation of the shaft 93, and also proportional to the output of the turn control signal generator 94, and therefore the rate of turn of the aircraft. It will also be apparent that the bank signal is introduced simultaneously with the turn signal so that any unpleasant skidding is avoided.

If the angle of bank called for by the bank control signal generator 95 is incorrect, the pendulum 128 is deflected from its center position and causes operation of the bank trim controller and the bank signal generator 125 in a direction to correct the bank angle in a manner which has already been described.

If during straight flight or during a banked turn, the human pilot desires to change the pitch attitude, say in a climbing direction, the handle 82 of the maneuvering switch 80 is actuated in a rearward direction which causes operation of the pitch controller 122 and the pitch control signal generator 123. This causes the signal generator 123 to introduce a voltage in the elevator signal circuit, giving an upward movement to the elevator 12 whereupon the nose of the aircraft rises. This action continues until the voltage output of the pitch responsive signal generator 66 is equal and opposite to the voltage output of the pitch control signal generator 69 when equilibrium is again established and the elevators are returned to the streamlined position. It will be apparent that the change in pitch attitude will depend upon the length of time the human pilot maintains the handle 82 displaced in the rearward direction.

If the human pilot displaces the handle 82 of the maneuvering switch to the right, or in a forward direction, or both, the reverse of the above-described operations will take place whereupon the airplane will make a coordinated turn to the right, or dive, or making a diving spiral as will be clearly apparent from the foregoing description.

Now let it be assumed that the human pilot has displaced the maneuvering switch handle 82 say to the left so that the turn controller 92 has moved off-center to produce a left turn, and that the human pilot has also displaced the handle 82 say in a forward direction, so that the pitch controller is also moved off the center position to cause a dive. Let it also be assumed that the bank angle introduced by the operation of the bank control signal generator 95 is not correct for the particular air speed of the aircraft so that it has been necessary for the pendulum-operated bank trim controller to move off the center position to correct the bank angle. Since all the controllers are off the center position, the switches 111, 111a and 111b will all be closed. If now the human pilot desires the aircraft to return automatically to straight and level flight, he needs only to momentarily depress the handle 82 to close the reset switch contacts 89 and 90. This causes the reset relays 110, 110a and 110b to pick up and seal in, whereupon the motors of the controllers 92, 122 and 127 are operated in a direction to restore them to the center or neutral position corresponding to straight and level flight. When the center position is reached, switches 111, 111a and 111b open, dropping out the reset relays whereupon the control system is conditioned for another maneuver. Due to the fact that the angular movement of the controller shafts is relatively slow due to the gear reduction, the return of the aircraft to straight and level flight is gradual, which is the desired condition to prevent discomfort and any extraordinary strain on the aircraft.

In view of the foregoing, it will be apparent that I have provided a maneuvering automatic pilot which can be conveniently controlled by the human pilot by means of a small maneuvering control switch. It will be noted that the bank angle is coordinated automatically with the rate of turn and speed of the aircraft so that the human pilot need not refer either to the natural horizon or to instruments to make perfect turns or spirals. Furthermore, to return the aircraft to straight and level flight from any maneuvering attitude, the human pilot needs only to momentarily operate the reset switch in some manner as by depressing the maneuvering switch in the illustrated arrangement. This leaves the human pilot free to perform other duties and also enables him to fly the aircraft perfectly in absolute darkness if it is desirable to do so.

Furthermore, it should be noted that stabilized operation with pendulum-bank control is obtained by a combination of controls which permit the angle of bank to be corrected in accordance with the position of the pendulum, but which prevent any instability or oscillation of the pendulum from being appreciably reflected in the response of the aircraft. Thus, if the pendulum 128 oscillates back and forth, the reversible motor 99b of the bank trim controller acts as an integrator so that the bank signal generator is positioned in accordance with the average position of the pendulum. Also, due to the action of the gear reduction 109b in the bank trim controller, the bank trim signal generator 125 does not respond appreciably to rapid oscillations of the pendulum. Another factor tending to prevent oscillations of the pendulum from being reflected in the response of the aircraft is the fact that the bank trim signal generator 125 is only a vernier or fine adjustment compared to the bank control signal generator 95 which introduces the approximate bank angle. A still further stabilizing factor is the fact that the stabilizing action of the vertical gyro 14 is maintained in turns as well as in straight and level flight. Thus, any sudden departures from the proper flight path, such as might be caused by air bumps, are immediately corrected for by the action of the bank and pitch-responsive signal generators 65 and 66. A still further stabilizing factor is the fact that the rate-of-turn signal generator 133 maintains a constant rate of turn so that the centrifugal acceleration on the pendulum is maintained constant while the pendulum is in the process of adjusting the bank angle for the rate of turn maintained. This prevents the cumulative action, referred to above, which tends to keep the pendulum in the bank increase position causing a progressively tighter turn.

Furthermore, it should be noted that with the above-described system it is not necessary that the pendulum remain in an off-center position to maintain bank correction as the position of the bank trim controller does not bear a fixed relation to the position of the pendulum. Therefore, the correct bank angle is obtained under all conditions of operation.

While I have shown and described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States, is:

1. In an automatic pilot for aircraft, means for maintaining the correct angle of bank during a turn, said means comprising position-maintaining means for measuring the bank inclination of said aircraft relative to true vertical, means controlled by said position-maintaining means for stabilizing said aircraft at a selected bank angle, two adjusting means for varying the stabilized bank angle, a turn controller for actuating one of said adjusting means, a reversible motor for actuating the other of said adjusting means, and means for controlling the direction of rotation of said reversible motor in accordance with the direction of departure of the vertical axis of said aircraft from apparent vertical during a turn.

2. In an automatic pilot for aircraft, means for maintaining the correct bank angle during a turn, said means comprising a vertical gyro, a servomotor controlled by said vertical gyro for actuating the ailerons of said aircraft to stabilize the lateral axis of said aircraft at a selected bank angle relative to true vertical, coarse and fine adjusting means for varying the stabilized bank angle, a turn controller for actuating said coarse bank-adjusting means, a reversible motor for actuating said fine adjusting bank-adjusting means, a pendulum mounted for pivotal movement about the longitudinal axis of said aircraft so as to be responsive to gravitational and centrifugal acceleration during a turn, and means controlled by said pendulum for causing rotation of said reversible motor in a direction dependent on the direction of deflection of said pendulum from an axis parallel to the vertical axis of said aircraft.

3. In a maneuvering automatic pilot for aircraft having aileron and rudder control surfaces for adjusting the position of said aircraft in bank and azimuth, a vertical gyro, a servomotor controlled by said vertical gyro for actuating said aileron control surface so as to stabilize said aircraft in bank, two separate bank-adjusting means for varying the angle of bank maintained by said vertical gyro-controlled servomotor, a turn controller for adjusting one of said bank-adjusting means, means responsive to a departure of the vertical axis of said aircraft from apparent vertical during a turn for actuating the other of said bank-adjusting means, a directional gyro, a rudder servomotor normally controlled by said directional gyro for actuating said rudder for maintaining straight flight, means responsive to movement of said turn controller from a neutral position for rendering said directional gyro ineffective to control said rudder servomotor and means also actuated by said turn controller for actuating said rudder servomotor in a direction to initiate a turn of said aircraft.

4. In a maneuvering automatic pilot for aircraft having aileron and rudder control surfaces for adjusting the angle of bank and rate of turn of said aircraft, bank stabilizing means for actuating said aileron control surface so as to stabilize said aircraft in a selected banking attitude, coarse and fine adjusting means for varying the angle of bank maintained by said bank stabilizing means, a turn control device, means operated by said turn control device for actuating said coarse bank angle adjustment of said bank stabilizing means to establish an approximate angle of bank for the desired turn, means also controlled by said turn control device for causing a relatively large displacement of said rudder control surface to initiate a turn in the desired direction, means responsive to the rate of the resulting turn of said aircraft to adjust said rudder control surface in accordance with the rate of turn whereby to limit the rate of turn to a predetermined value, and means responsive to lateral acceleration or side slip of said aircraft for actuating said fine bank angle adjustment means in a direction to obtain the correct bank angle for the air speed and established rate of turn of said aircraft.

5. In a maneuvering automatic pilot for aircraft having aileron and rudder control surfaces, a signal responsive rudder servomotor for actuating said rudder control surface, a signal responsive aileron servomotor for actuating said aileron control surface, a turn-responsive signal generator and a turn control signal generator connected to jointly control said rudder servomotor, a bank responsive signal generator and two bank adjustment signal generators connected to jointly control said aileron servomotor, means responsive to displacement of said aircraft about its turn axis for actuating said turn responsive signal generator, means responsive to displacement of said aircraft about its bank axis for actuating said bank-responsive signal generator, a turn controller connected to actuate said turn control signal generator and one of said bank adjustment signal generators for making coordinated turns of said aircraft, means for rendering said turn-responsive signal generator unresponsive to a turning of said aircraft when said turn controller is actuated from a neutral straight flight position to prevent said turn-responsive generator from nullifying effect of said turn control signal generator upon a turning of said aircraft, and means responsive to lateral acceleration or side slip of said aircraft for actuating the other of said bank adjustment signal generators to obtain the correct banking angle for various speeds of said aircraft.

6. In a maneuvering automatic pilot for aircraft having aileron and rudder control surfaces, a signal-responsive rudder servomotor for actuating said rudder control surface, a signal-responsive aileron servomotor for actuating said aileron control surface, a turn-responsive signal generator, a rate-of-turn-responsive signal generator, and a turn control signal generator connected to jointly control said rudder servomotor, a bank-responsive signal generator, and two bank adjustment signal generators connected to jointly control said aileron servomotor, means responsive to displacement of said aircraft about its turn axis for actuating said turn-responsive signal generator, means responsive to rate of turn of said aircraft about its turn axis for actuating said rate of turn signal generator, means responsive to displacement of said aircraft about its bank axis for actuating said bank-responsive signal generator, a turn controller connected to actuate said turn control signal generator and one of said bank adjustment signal generators for making coordinated turns of said aircraft, means for rendering said turn-responsive signal generator unresponsive to a turning of said aircraft when said turn controller is actuated from a neutral straight flight position to prevent said turn-responsive signal generator from nullifying the effect of said turn control signal generator upon a turning of said aircraft, and means responsive to lateral acceleration or side slip of said aircraft for adjusting the other of said bank adjustment signal generators to obtain the correct banking angle at various air speeds.

7. In an automatic pilot for aircraft having a control surface for controlling the movement of said aircraft about a control axis, position-maintaining means for detecting angular movement of said aircraft about said control axis, rate-responsive means for detecting rate of angular movement of said aircraft about said control axis, servo means for actuating said control surface, a turn controller, means actuated by said position-maintaining means, said rate responsive means, said turn controller, and said servo means, for generating control signals, means for algebraically adding said control signals and controlling said servo means in accordance with the resultant thereof, and means responsive to displacement of said turn controller from a neutral position for rendering said position-maintaining means ineffective to control said servo means.

8. In an automatic pilot for aircraft having a control surface for controlling the movement of said aircraft about a control axis, position-maintaining means for detecting angular movement of said aircraft about said control axis, rate-responsive means for detecting rate of angular movement of said aircraft about said control axis, servo means for actuating said control surface, a turn controller, means actuated by said position-maintaining means, said rate-responsive means, and said servo means, for generating control signals, means for algebraically adding said control signals and controlling said servo means in accordance with the resultant thereof, and means responsive to movement of said turn controller from a neutral position for rendering said position-maintaining means ineffective and for producing an additional control signal for controlling the position of said servo means, the signals produced in accordance with the rate of turn of said aircraft tending to oppose angular turning of said aircraft about said control axis whereby when said turn controller is in said neutral position said rate of turn-responsive means acts to stabilize said aircraft in straight flight and when said turn controller is displaced to initiate a turn said rate-of-turn-responsive device acts to maintain a rate of turn variable in accordance with signal produced by movement of said turn controller.

9. In a maneuvering automatic pilot for aircraft, turn control means having a neutral straight flight position and being operable in either direction from neutral for right or left turn, means controlled by said turn control means for causing said aircraft to make coordinated turns to the right or left, the direction of turn and rate of turn depending upon the direction and amount of displacement of said control means from said neutral position, a reversible motor for actuating said turn control means in either direction, a maneuvering switch for controlling the direction of rotation of said reversible motor, a reset switch, and relay means for causing said reversible motor to return said turn control means to said neutral position upon a momentary closure of said reset switch.

10. In a maneuvering automatic pilot for controlling an aircraft, stabilizing means for stabilizing said aircraft about the turn, bank and pitch axes, turn control means cooperating with said stabilizing means for initiating a turn and adjusting the proper bank angle of said aircraft for said turn, pitch control means cooperating with said stabilizing means for adjusting the pitch angle of said aircraft, reversible motor means for actuating said turn and pitch control means in either direction from a neutral position corresponding to straight and level flight, a maneuvering switch for controlling said reversible motor means to permit maneuvering of said aircraft, a reset switch, and relay means actuated by said reset switch for additionally controlling said reversible motor means to restore said turn and pitch control means to said neutral position whereby to restore said aircraft to straight and level flight from a maneuvering attitude previously set by operating of said maneuvering switch.

11. In a maneuvering automatic pilot for controlling an aircraft, stabilizing means for stabilizing said aircraft about the turn, bank and pitch axes, a turn controller cooperating with said stabilizing means for initiating a turn and adjusting the approximate bank angle of said aircraft for said turn, a bank trim controller cooperating with said stabilizing means for additionally adjusting the bank angle to compensate for variations in air speed, a pitch controller cooperating with said stabilizing means for adjusting the pitch angle of said aircraft, reversible motor means for actuating said turn, bank trim, and pitch controllers in either direction from a neutral position corresponding to straight and level flight, a maneuvering switch for controlling the reversible motor means actuating said turn and pitch controllers to permit maneuvering of said aircraft, means responsive to lateral acceleration or side slip of said aircraft for controlling reversible motor means actuating said bank trim controller, a reset switch, and relay means actuated by said reset switch for additionally controlling said reversible motor means to restore said turn, bank trim, and pitch controllers to said neutral position whereby to restore said aircraft to straight and level flight from a maneuvering attitude previously set by operation of said maneuvering switch and said bank trim controller.

CHARLES M. YOUNG.

REFERENCES CITED

The following references are of record in the file of this patent:

UNITED STATES PATENTS

| Number | Name | Date |
|---|---|---|
| 1,418,335 | Sperry | June 6, 1922 |
| 2,144,616 | Carlson | Jan. 24, 1939 |
| 2,162,862 | Protzen | June 20, 1939 |
| 2,190,390 | Thiry | Feb. 13, 1940 |
| 2,270,875 | Hanson et al. | Jan. 27, 1942 |
| 2,280,116 | Carlson | Apr. 21, 1942 |
| 2,340,524 | Fischel et al. | Feb. 1, 1944 |
| 2,371,388 | Glenny | Mar. 13, 1945 |
| 2,373,315 | Kenyon | Apr. 10, 1945 |